(12) United States Patent
Sasaki

(10) Patent No.: US 12,218,549 B2
(45) Date of Patent: Feb. 4, 2025

(54) ROTARY ELECTRIC MACHINE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventor: Naoya Sasaki, Nagoya Aichi (JP)

(73) Assignees: Kabushiki Kaisha Toshiba, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 267 days.

(21) Appl. No.: 18/066,810

(22) Filed: Dec. 15, 2022

(65) Prior Publication Data

US 2023/0179042 A1 Jun. 8, 2023

Related U.S. Application Data

(63) Continuation of application No. PCT/JP2021/044390, filed on Dec. 3, 2021.

(51) Int. Cl.
  *H02K 1/276* (2022.01)
  *H02K 1/16* (2006.01)
(52) U.S. Cl.
  CPC .............. *H02K 1/276* (2013.01); *H02K 1/16* (2013.01); *H02K 2201/03* (2013.01); *H02K 2213/03* (2013.01)
(58) Field of Classification Search
  CPC ...... H02K 1/276; H02K 1/16; H02K 2201/03; H02K 2213/03

USPC .......................................... 310/179, 216.092
See application file for complete search history.

(56) References Cited

U.S. PATENT DOCUMENTS

| | | |
|---|---|---|
| 2004/0012292 A1 | 1/2004 | Kometani et al. |
| 2010/0117465 A1 | 5/2010 | Kamiya et al. |
| 2012/0043849 A1 | 2/2012 | Yoneda et al. |
| 2013/0119810 A1 | 5/2013 | Aoyama |
| | (Continued) | |

FOREIGN PATENT DOCUMENTS

| | | |
|---|---|---|
| JP | 2011-67090 A | 3/2011 |
| JP | 5073805 B2 | 11/2012 |
| | (Continued) | |

OTHER PUBLICATIONS

Japan Patent Office, International Search Report in International Application No. PCT/JP2021/044390 (Feb. 22, 2022), 2 pages, and machine translation, 2 pages.

*Primary Examiner* — Jose A Gonzalez Quinones
(74) *Attorney, Agent, or Firm* — Finnegan, Henderson, Farabow, Garrett & Dunner, LLP

(57) ABSTRACT

According to one embodiment, a rotary electric machine includes a stator and a rotor. In a stator iron core of the stator, tips of the teeth defining openings of the slots through which the armature windings of different phases pass include a pair of chamfers. A rotor iron core of the rotor includes a plurality of grooves the outer peripheral surface of which is concave along a central axis line. Each of the grooves forms a wave shape, and includes a first groove portion disposed in a leading side of the rotation direction and a second groove portion disposed in a trailing side of the rotation direction. The first groove portion and the second groove portion are asymmetric with respect to d-axis.

10 Claims, 12 Drawing Sheets

(56) References Cited

U.S. PATENT DOCUMENTS

| | | | |
|---|---|---|---|
| 2017/0373550 A1* | 12/2017 | Soma | .................... H02K 1/146 |
| 2022/0209600 A1 | 6/2022 | Hisada et al. | |
| 2022/0344987 A1 | 10/2022 | Tanaka | |

FOREIGN PATENT DOCUMENTS

| | | | | |
|---|---|---|---|---|
| JP | 2013-106496 A | | 5/2013 | |
| JP | 5253098 B2 | | 7/2013 | |
| JP | 5267521 B2 | | 8/2013 | |
| JP | 2014-108026 A | | 6/2014 | |
| JP | 3590623 B2 | | 11/2014 | |
| JP | 6075034 B2 | | 2/2017 | |
| JP | 2017-55560 A | | 3/2017 | |
| JP | 2018-85877 A | | 5/2018 | |
| JP | 6638135 B2 | | 1/2020 | |
| JP | 6950361 B2 | * | 10/2021 | |
| KR | 20150142918 A | * | 12/2015 | |
| WO | WO-2008153171 A1 | * | 12/2008 | ........... H02K 1/2766 |
| WO | WO-2020105465 A1 | * | 5/2020 | |
| WO | WO 2021/060209 A1 | | 4/2021 | |
| WO | WO 2021/084788 A1 | | 5/2021 | |

\* cited by examiner

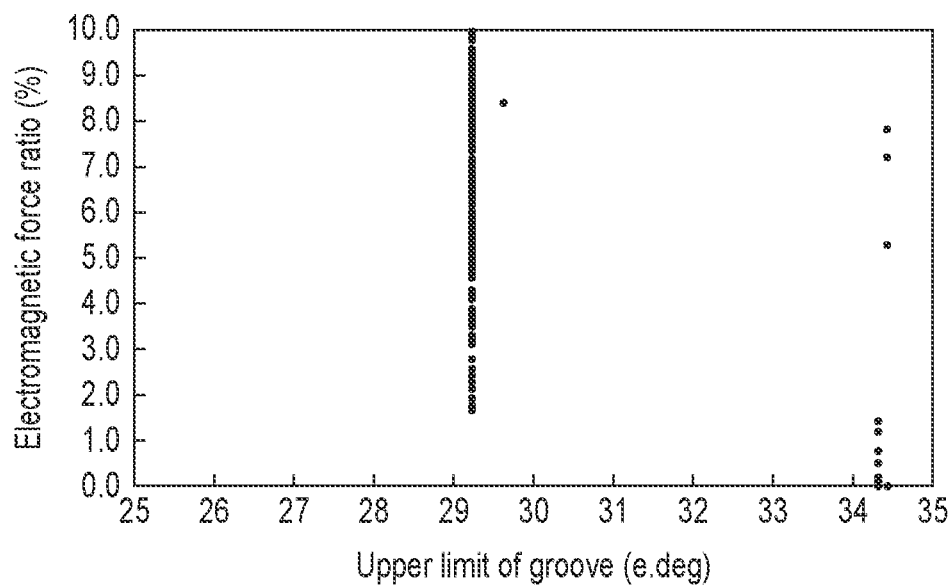
F I G. 12
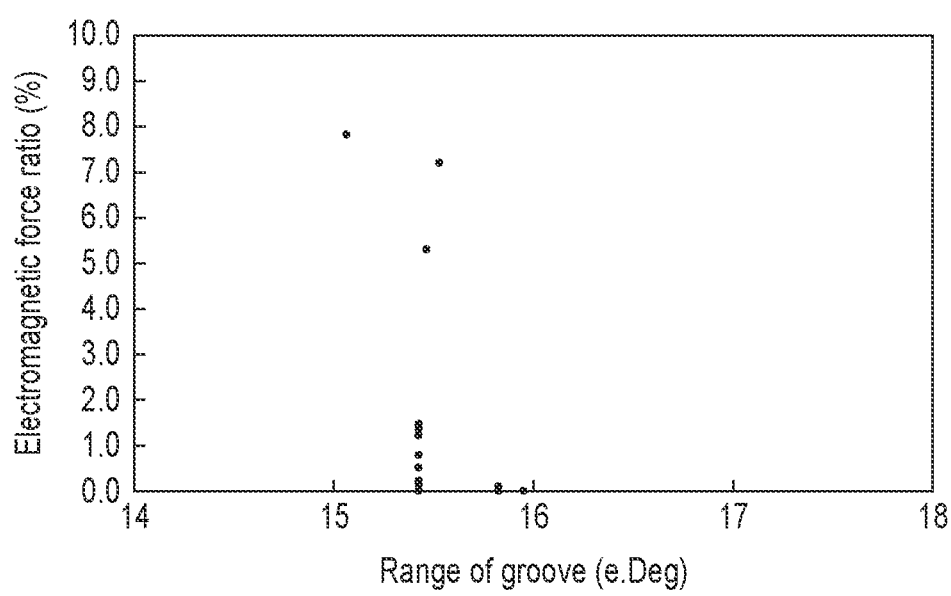
F I G. 13

ROTARY ELECTRIC MACHINE

CROSS-REFERENCE TO RELATED APPLICATIONS

This application is a Continuation Application of PCT Application No. PCT/JP2021/044390, filed Dec. 3, 2021, the entire contents of which are incorporated herein by reference.

FIELD

Embodiments described herein relate generally to a rotary electric machine.

BACKGROUND

For example, a permanent magnet synchronous motor (PMSM) is a rotary electric machine used in automobiles, railcars, etc., to drive vehicles, and an interior permanent magnet synchronous motor (IPMSM) type in which permanent magnets are embedded in a rotor iron core is popular.

An IPMSM includes a stator with armature winding (coil) wound around a stator iron core, and a rotor which rotates freely with respect to the stator and has permanent magnets embedded in slots in the rotor iron core. In the IPMSM, when a desired current is applied to the armature winding, a magnetic flux is generated in the armature winding. The rotor rotates due to the magnetic attraction and repulsion between the flux and the permanent magnet.

In rotary electric machines such as IPMSM, for example, a combination of the number of poles and slots in the rotor causes harmonics in the rotational torque and electromagnetic force. For example, in a rotary electric machine with 8 poles and 48 slots, which is often used as an in-vehicle motor, harmonics of the 6th order of the electric angle and integer multiples thereof would be often generated. Such harmonics often cause vibration and noise, and they must be properly suppressed.

The present invention is based on the above, and is to provide a rotary electric machine which can suppress harmonics of electromagnetic force at a targeted operating point and reduce vibration and noise.

BRIEF DESCRIPTION OF THE DRAWINGS

FIG. 12 illustrates a relationship between an electric angle ($\theta$RP2) of the second groove portion and the electromagnetic force ratio.

FIG. 13 illustrates a relationship between a second range ($\theta$RW) and the electromagnetic force ratio.

DETAILED DESCRIPTION

Embodiments will be described below with reference to the drawings. The same symbols will be applied to common configurations throughout the embodiments, and redundant explanations will be omitted. The figures are schematic diagrams to facilitate understanding of the embodiments and their shapes, dimensions, ratios, etc., may differ from the actual devices, but these may be redesigned as appropriate, taking into account the following description and publically-known technique.

In general, according to one embodiment, a rotary electric machine includes a stator and a rotor. The stator includes a cylindrical stator iron core in which teeth and slots are arranged alternately in a circumferential direction, and multi-phase armature windings passing through the slots to be wound about the teeth. The rotor includes a rotor iron core with a plurality of magnetic poles aligned along an outer peripheral surface which is opposed to an inner peripheral surface of the stator iron core with a gap therebetween, and a plurality of permanent magnets provided with each of the magnetic poles, the rotor disposed rotatably about a central axis line which is coaxial with the stator iron core. In the stator iron core, tips of the teeth defining openings of the slots in the inner peripheral surface between the slots through which the armature windings of different phases pass include a pair of chamfers which are both ends of the inner peripheral surface partially omitted in the circumferential direction. Given that, in the horizontal cross-section of the rotor iron core which is orthogonal to the central axis line, an axis extending radially passing an end of the magnetic pole in the circumferential direction and the central axis line is q-axis and an axis electrically apart from the q-axis in the circumferential direction at 90 degrees is d-axis. In each of the magnetic poles, the rotor iron core includes a plurality of grooves the outer peripheral surface of which is concave along the central axis line. Each of the grooves forms a wave shape in which concave portions are placed on both sides of a convex portion along a rotation direction of the rotor, and includes a first groove portion disposed in a leading side of the rotation direction with respect to the d-axis between the q-axis passing the both ends of the magnetic pole in the circumferential direction and a second groove portion disposed in a trailing side of the rotation direction. The first groove portion and the second groove portion are asymmetric with respect to the d-axis.

Figure 1:
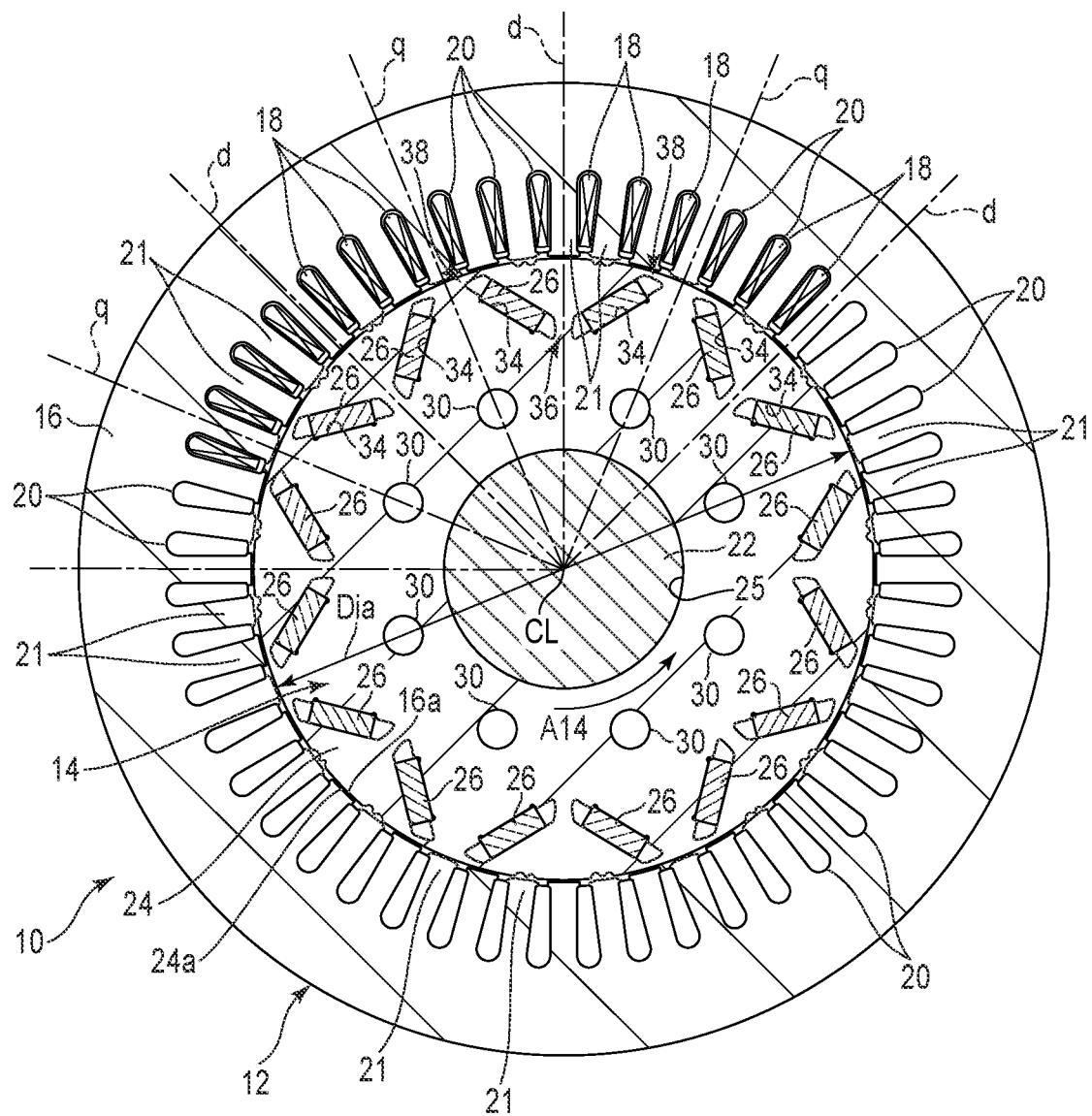
FIG. 1 is a cross-sectional view of a permanent magnet type rotary electric machine of an embodiment.

FIG. 1 illustrates a cross-sectional view of a permanent magnet type rotary electric machine, specifically, a cross-sectional view of the rotary electric machine in a plane orthogonal to the central axis line. The rotary electric machine is applied, for example, as a drive motor or generator in hybrid electric vehicles (HEV) and electric vehicles (EV). However, the rotary electric machine is not limited to these applications and can be applied to other applications as well.

As in FIG. 1, a rotary electric machine 10 is configured as, for example, an inner rotor type rotary electric machine. The rotary electric machine 10 includes an annular or cylindrical stator 12 supported by a fixed frame which is not shown, and a rotor 14 which is rotatable about the central axis line CL inside the stator 12 and is supported concentrically with the stator 12. In the following description, the direction of rotation of rotor 14 in rotary electric machine 10 along the central axis will be referred to as axial direction, and the direction in which the rotor 14 rotates around the central axis line CL will be referred to as circumferential direction. Furthermore, the direction orthogonal to the axial direction and circumferential direction will be radial direction, and the side approaching the central axis line CL in the radial direction will be inside and the side moving away from the central axis line CL will be outside.

The stator 12 includes a cylindrical stator iron core 16 and an armature winding (coil) 18 wound around the stator iron core 16. The stator iron core 16 includes a number of circular electromagnetic steel sheets of magnetic material, such as silicon steel, stacked in a concentric manner. The stator iron core 16 includes a plurality of slots 20 and teeth 21, respectively. The slots 20 are aligned at substantially regular intervals in a circumferential direction. Each of the slots 20 has an opening in the inner peripheral surface of the stator iron core 16, and extends in the radial direction (radially) from the inner peripheral surface. Furthermore, each slot 20 is continuous over the entire axial length of the stator iron core 16. By forming a plurality of slots 20, in the inner peripheral part of the stator iron core 16, a plurality of teeth 21 (48 in the present embodiment, for example) are formed between slots 20 adjacent to each other in the circumferential direction. In other words, each void between adjacent teeth 21 in the circumferential direction is configured as a slot 20. In such a manner, the teeth 21 and slots 20 are arranged alternately in the circumferential direction. The armature winding 18 is wound around the teeth 21 through the slots 20. The armature winding 18 corresponds to multiple phases, e.g., three phases of U, V, and W. In the present embodiment, the armature winding 18 of the same phase passes through two adjacent slots 20 in a circumferential direction, and the slots 20 corresponding to phases U, V, and W are arranged in order in the circumferential direction. By passing current through the armature winding 18, a predetermined chain flux is formed in the stator 12, specifically in the teeth 21.

The rotor 14 is supported by bearings (not shown) at both ends in the axial direction and can rotate freely with a shaft (rotary shaft) 22 around the central axis line CL. Therefore, the rotor 14 is arranged concentrically with the stator 12 with the outer peripheral surface facing the inner peripheral surface of stator 12 with a slight gap therebetween. In the present embodiment, the rotor 14 rotates in the direction indicated by arrow A14 of FIG. 1.

The rotor 14 includes a rotor iron core 24 and a permanent magnet 26. The rotor iron ore 24 has an substantial cylindrical shape with an inner hole 25 concentric with the central axis line CL. The shaft 22 is inserted and fitted into the inner hole 25 and extends concentrically with the rotor iron core 24. The inner hole 25 is a hole for fitting and securing the shaft 22 to the rotor 14. The rotor iron core 24 is structured with a number of circular electromagnetic steel sheets of magnetic material, e.g., silicon steel, stacked concentrically and has a plurality of magnetic poles (eight poles, for example in the present embodiment). The number of magnetic poles is not particularly limited. Each of the poles is aligned along the outer peripheral surface 24a of the rotor iron core 24, and is opposed to the inner peripheral surface 16a of the stator iron core 16 with a gap therebetween. Each of the permanent magnets 26 is provided with a pole of the rotor iron core 24.

Here, in the transverse section of the rotor iron core 24 orthogonal to the central axis line CL as in FIG. 1, the q-axis and d-axis are defined as follows. The transverse section of the rotor iron core 24 is in a state where grooves 5 (first groove 51 and second groove 52) are not provided on the outer peripheral surface 24a, which will be described later. The q-axis is an axis extending in the radial direction (radially) passing the circumferential direction end of the magnetic poles of the rotor iron core 24 and the central axis line CL. The d-axis is an axis electrically separated from the q-axis by 90 degrees in the circumferential direction. In this example, the direction in which the chain flux formed by the stator 12 easily flows will be referred to as q-axis. The d-axis and q-axis are arranged alternately and at a predetermined phase in the circumferential direction of the rotor iron core 24. One pole of the rotor iron core 24 is an area between q-axes (⅛ circumferential angle area). Thus, the rotor iron core 24 is structured with eight poles (magnetic poles). The center of one pole in the circumferential direction is the d-axis.

As in FIG. 1, two permanent magnets 26 per pole are embedded in the rotor iron core 24. In the circumferential direction of the rotor iron core 24, on both sides of each d-axis, there are magnet holes (hereinafter referred to as embedding holes) 34 with a shape corresponding to the shape of the permanent magnets 26. The two permanent magnets 26 are each loaded and positioned in the embedding holes 34. The permanent magnets 26 may be secured to the rotor iron core 24 by, for example, an adhesive.

Each of the embedding holes 34 passes through the entire axial length of the rotor iron core 24. The embedding holes 34 have an abbreviated trapezoidal aperture shape and are each inclined with respect to the d-axis. When viewed in a transverse section of the rotor iron core 24 orthogonal to the central axis line CL as in FIG. 1, the two embedding holes 34 are arranged side by side in a substantial V-shape, for example. That is, the inner peripheral edges of the two embedding holes 34 are each adjacent to the d-axis and face each other with a small gap therebetween. In the rotor iron core 24, a narrow magnetic path narrowing portion (bridge portion) 36 is formed between the inner peripheral ends of the two embedding holes 34. The outer peripheral ends of the two embedding holes 34 are spaced apart from the d-axis along the circumferential direction of the rotor iron core 24, and are positioned in the vicinity of the outer peripheral surface 24*a* of the rotor iron core 24 and in the vicinity of the q-axis. Thus, the outer peripheral end of the embedding hole 34 is opposed to the outer peripheral end of the embedded holes 34 of the adjacent poles across the q-axis. In the rotor iron core 24, a narrow magnetic path narrowing portion (bridge section) 38 is formed between the outer peripheral end of each of the embedded holes 34 and the outer peripheral surface 24*a* of the rotor iron core 24. Thus, the two embedding holes 34 are arranged such that the distance from the d-axis gradually widens from the inner peripheral end to the outer peripheral end.

The permanent magnets 26 are loaded into each of the embedment holes 34 and embedded in the rotor iron core 24. The permanent magnet 26 is formed as an elongated flat plate with a rectangular cross section, for example, as in FIG. 1, and has a first surface (front) and a second surface (back) parallel to each other, and a pair of mutually opposed sides. The permanent magnet 26 has a length that is approximately equal to the total axial length of the rotor iron core 24. The permanent magnet 26 may be composed of a combination of magnets divided into a plurality of magnets in the axial (longitudinal) direction, in which case the total length of the plurality of magnets will be set approximately equal to the total length of the rotor iron core 24. Each of the permanent magnets 26 is embedded over the entire axial length of the rotor iron core 24. The magnetization direction of the permanent magnets 26 is orthogonal to the first and second planes of the permanent magnets 26.

In the rotor iron core 24, the two permanent magnets 26 located on both sides of each d-axis, that is, the two permanent magnets structuring one pole are arranged such that the direction of magnetization is the same. The two permanent magnets 26 located on both sides of each q-axis are arranged such that the magnetization directions are opposite. By arranging the permanent magnets 26 in this manner, the area on each d-axis in the periphery of the rotor iron core 24 is formed around a single magnetic pole, and the area on each q-axis is formed around an intermagnetic pole. In the present embodiment, the rotary electric machine 10 is a permanent magnet embedded type rotary electric machine having 8 poles (4-pole pair) in which the front and back of N and S poles of the permanent magnets 26 are arranged alternately in adjacent poles, 48 slots, and wound in a distributed winding.

As in FIG. 1, the rotor iron core 24 includes a plurality of void holes (cavities) 30. The void holes 30 pass through the rotor iron core 24 along its entire axial length. The void holes 30 are located in approximately the center of the rotor iron core 24 in the radial direction on the q-axis, between two embedding holes 34 of adjacent magnetic poles. In the example of FIG. 1, the void hole 30 has an abbreviated circular cross-sectional shape. The void holes 30 function as a flux barrier which makes it difficult for magnetic flux to pass through, and regulates the flow of the chain flux of the stator 12 and the magnetic flux of the permanent magnet 26. The formation of the void holes 30 also reduces the weight of the rotor iron core 24.

Figure 2:
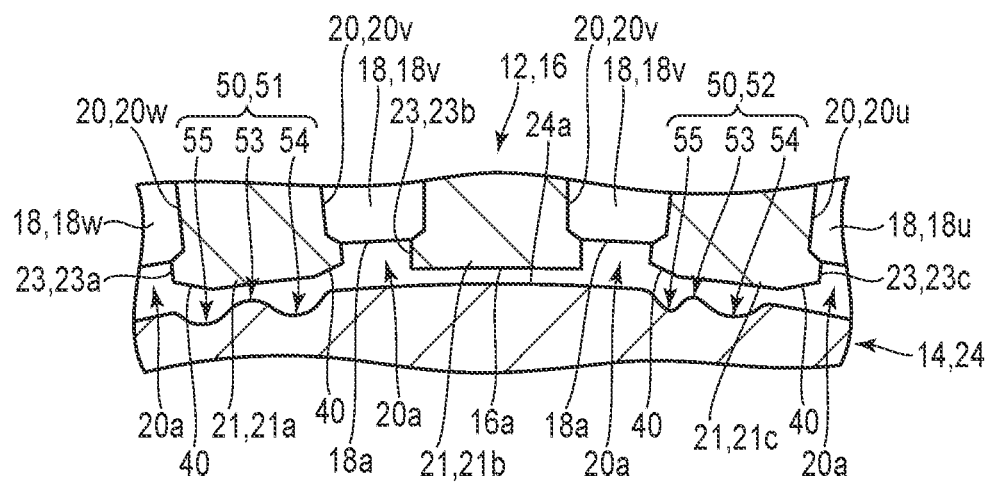
FIG. 2 is a cross-sectional view illustrating a stator iron core of a stator and a rotor iron core of a rotor of the rotary electric machine of FIG. 1, in a partially enlarged manner.

As in FIGS. 1 and 2, in the present embodiment, the teeth 21 of stator iron core 16 have a plurality of chamfers 40, and the rotor iron core 24 has a plurality of grooves 50. The chamfers 40 and the grooves 50 will be described below. FIG. 2 illustrates the stator iron core 16 of the stator 12 and the rotor iron core 24 of the rotor 14 of the rotary electric machine 10 of FIG. 1 in a partially enlarged manner, respectively.

The chamfer 40 is, at the tip 23 of the teeth 21, a portion formed by omitting a part of both ends of the circumferential direction of the inner peripheral surface, and is arranged in a pair in the circumferential direction. The pair of chamfers 40 are symmetrical about the bisector of the maximum width (W2) of the circumferential direction of the tip 23, which will be described later. The tip 23 is the portion defining the inner peripheral surface 16*a* of the stator iron core 16, and defining the edge of the opening 20*a* of the slot 20 in the inner peripheral surface 16*a*. In the example of FIG. 2, the tip 23 protrudes inwardly from the inner peripheral end 18*a* of the armature winding 18, which is wound through the slot 20 and onto the teeth 21, and holds the inner peripheral end 18*a*.

Among the tips 23 of the teeth 21, the tips 23 of the teeth 21 defining, between slots 20 through which armature windings 18 of different phases pass, edges of openings 20*a* of the slots 20 include chamfers 40. In contrast, the tips 23 of the teeth 21 defining, between slots 20 through which armature windings 18 of same phase pass, edges of openings 20*a* of the slots 20 do not include a chamfer 40.

In the example of FIG. 2, the teeth 21*a* define, between slot 20*w* through which the W-phase armature winding 18*w* passes and slot 20*v* through which the V-phase armature winding 18*v* passes, edges of the openings 20*a* of the slots 20*w* and 20*v*. Furthermore, the teeth 21*c* define, between the slot 20*v* through which the V-phase armature winding 18*v* passes and the slot 20*u* through which the armature winding 18*u* of U-phase passes, edges of the openings 20*a* of the slots 20*v* and 20*u*. Thus, the tips 23*a* of the teeth 21*a* and the tips 23*c* of the teeth 21*c* include chamfers 40. In contrast, teeth 21*b* define, between slots 20*v* through which the V-phase armature winding 18*v* pass, edges of the openings 20*a* of the slots 20*v* and 20*v*. Thus, the tips 23*b* of the teeth 21*b* do not have a chamfer 40. This allows the stator iron core 16 is arranged every other teeth 21 with respect to the teeth 21 aligned at substantially regular intervals in the circumferential direction. In other words, the stator iron cores 16 are arranged alternately for each of the teeth 21.

The groove 50 is, in each pole of the rotor iron core 24, a concave portion of the outer peripheral surface 24*a* along the central axis line CL, and is continuous along the entire axial length of the rotor iron core 24. Each pole is an area between two adjacent q-axes in the circumferential direction in the rotor iron core 24, that is, in the direction of rotation of rotor 14 (direction indicated by arrow A14 shown in FIG. 1, hereafter referred to as the rotation direction A14). In the present embodiment, the rotor 14 rotates in one direction, indicated by the rotation direction A14, and no rotation in the opposite direction is considered. The groove 50 has a first groove portion 51 and a second groove portion 52. That is, the groove 50 in each pole of the rotor iron core 24 includes a first groove portion 51 and a second groove portion 52. The first groove portion 51 is a groove 50 located, in each pole, on the leading side of the rotation direction A14 with respect to the d-axis between the q-axes passing the both ends of the pole in the circumferential direction. The second groove portion 52 is a groove 50 located, in each pole, on the backward side of the rotation direction A14 with respect to the d-axis between q-axes passing through the both ends of the pole in the circumferential direction. Note that, the d-axis is, in each pole of the rotor iron core 24, the d-axis located between the q-axes passing through both ends of the pole in the circumferential direction. In the example of FIG. 2, the groove 50 located on the left side, which is the leading side of the rotation direction A14, is the first groove portion 51, and the groove 50 located on the right side, which is the trailing side, is the second groove portion 51.

The first groove portion 51 and the second groove portion 52 have concave portions 54 and 55 on both sides of a convex portion 53 in the rotation direction A14, in short, in a wave-like shape along the circumferential direction. In other words, the concave portion 54, convex portion 53, and concave portion 55 are aligned in the rotation direction A14 in succession, and the waveforms of the first groove portion 51 and the second groove portion 52 are formed, respectively.

The first groove portion 51 and the second groove portion 52 are asymmetry with respect to the d-axis. In the example of FIG. 2, the first groove portion 51 and the second groove portion 52 are asymmetrical about the d-axis due to their different waveforms and different positions in the circumferential direction.

Figure 3:
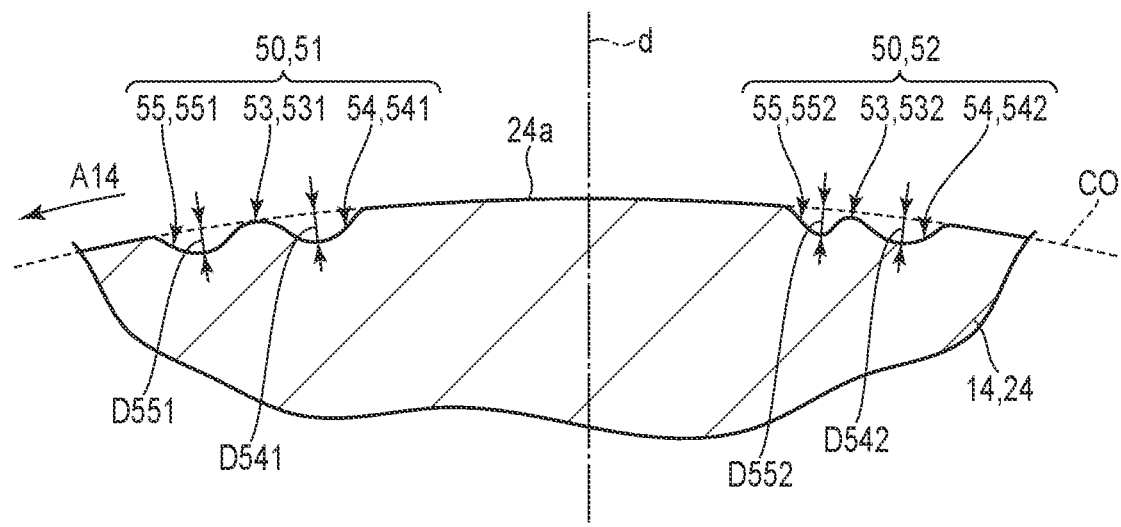
FIG. 3 illustrates a model of grooves of FIGS. 1 and 2 (first groove portion and second groove portion), in an enlarged manner.

FIG. 3 illustrates the first groove portion 51 and second groove portion 52 of FIGS. 1 and 2 in an enlarged manner. As in FIG. 3, in the first groove portion 51, between two concave portions 54 and 55, a maximum distance D541 from the concave portion 541 closer to the d-axis to the circumscribed circle CO contacting the outer peripheral surface 24a of the rotor iron core 24 is greater than the maximum distance D551 from the other concave portion 551 to the circumscribed circle CO. The maximum distances D541 an D551 are the distances from the deepest part of the concave portions 541 and 551 to the circumscribed circle CO, and the distances on a straight line passing the deepest part and orthogonal to the tangent line of the circumscribed circle CO. The convex portion 531 is located inside the circumscribed circle CO. In other words, the top of convex portion 531 does not contact the circumscribed circle CO. In the second groove portion 52, of the two concave portions 54 and 55, the maximum distance D552 from one of the concave portions 552 closer to the d-axis to the circumscribed circle CO is greater than the maximum distance D542 from the other concave portion 552 to the circumscribed circle CO. The maximum distances D552 and D542 are the distances from the deepest part of the concave portions 552 and 542 to the circumscribed circle CO, and are the distances on a straight line passing the deepest part and orthogonal to the tangent line of the circumscribed circle CO. The convex portion 532 is located inside the circumscribed circle CO. In other words, the top of convex portion 532 does not contact the circumscribed circle CO.

As above, the rotary electric machine 10 of the present embodiment includes both the above-described chamfers 40 and grooves 50 (the first groove portion 51 and second groove portion 52). Based on a structure with such chamfers 40 and grooves 50, the best mode of each of the chamfers 40 and grooves 50 will be described.

Figure 4:
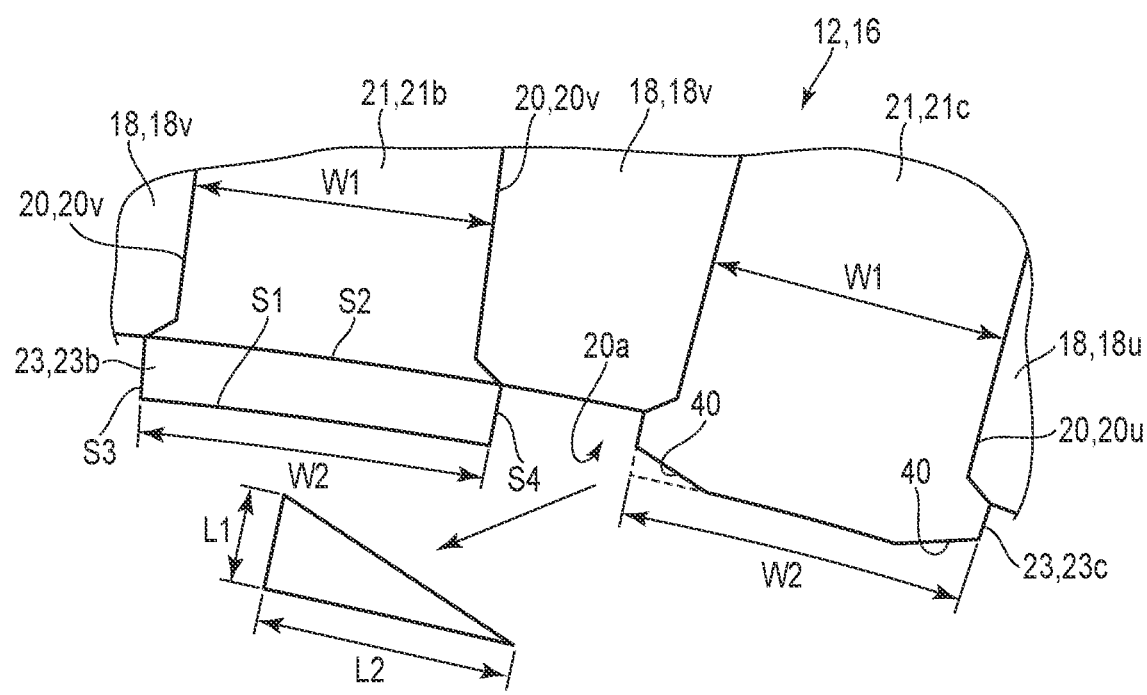
FIG. 4 illustrates the proximity of a tip of the teeth of FIG. 2 in an enlarged manner as a model of the tip of the teeth of the stator iron core.

First, the optimal model of the chamfer 40 in the teeth 21 will be explained with reference to FIG. 4. FIG. 4 illustrates, as a model of the tip 23 of the teeth 21, the vicinity of tips 23b and 23c of the teeth 21b and 21c of FIG. 2 in an enlarged manner. The teeth 21c is an example of teeth 21 with a chamfer 40, and teeth 21b is an example of teeth 21 without a chamfer 40. The model of the teeth 21 other than the teeth 21c with chamfer 40 (e.g., teeth 21a) is the same as that of the teeth 21c. Furthermore, the model of the teeth 21 other than the teeth 21b without a chamfer 40 is the same as that of the teeth 21b.

As in FIG. 4, in the teeth 21b, 21c, the maximum width of the teeth 21b and 21c in the circumferential direction is W1, and the maximum width of the tips 23b and 23c in the circumferential direction is W2. The width in the circumferential direction is an intersurface distance in the teeth 21 in the axial direction and in the direction perpendicular to the radial direction. The maximum width of the teeth 21b and 21c in the circumferential direction (W1) is the maximum width of the portions of the teeth 21b and 21c other than the tips 23b and 23c in the circumferential direction. In the present embodiment, the maximum width (W2) in the circumferential direction of the tips 23b and 23c of the teeth 21b and 21c is greater than the maximum width (W1) of the teeth 21b and 21c in the circumferential direction (W1<W2).

In addition, in teeth 21c, a radial length of each of the chamfers 40 is L1, and a length in the circumferential direction is L2. The planar shape of the chamfer 40 as viewed from the direction of the central axis line CL is a substantial triangular shape defined by the sides of length L1 and length L2.

In the teeth 21b without the chamfer 40, an area of the tip 23b viewed from the direction of the central axis line CL (axis direction) is S (hereinafter referred to as tip area). The tip area (S) is the area enclosed by arcs S1 and S2 and two straight sides S3 and S4. The arc S1 defines the inner peripheral surface 16a of stator iron core 16. The arc S2 is a circular arc parallel to arc S1, and its tip 23b defines a boundary between the area where the tip 23b is the maximum width (W2) in the circumferential direction and other areas. The two edges S3 and S4 define edges of openings 20a of the slots 20 in the inner peripheral surface 16a. Furthermore, in the teeth 21c with a chamfer 40, the area of the chamfer 40 viewed from the axial direction is Ac. The area (Ac) is a substantially triangular area defined by a side of length L1 and a side of length L2, and is approximately $L1 \times L2/2$. Therefore, the total area of the pair of chamfers 40 viewed from the axial direction (hereinafter referred to as missing area) is twice the aforementioned area of the chamfers 40 ($Ac \times 2$).

Figure 5:
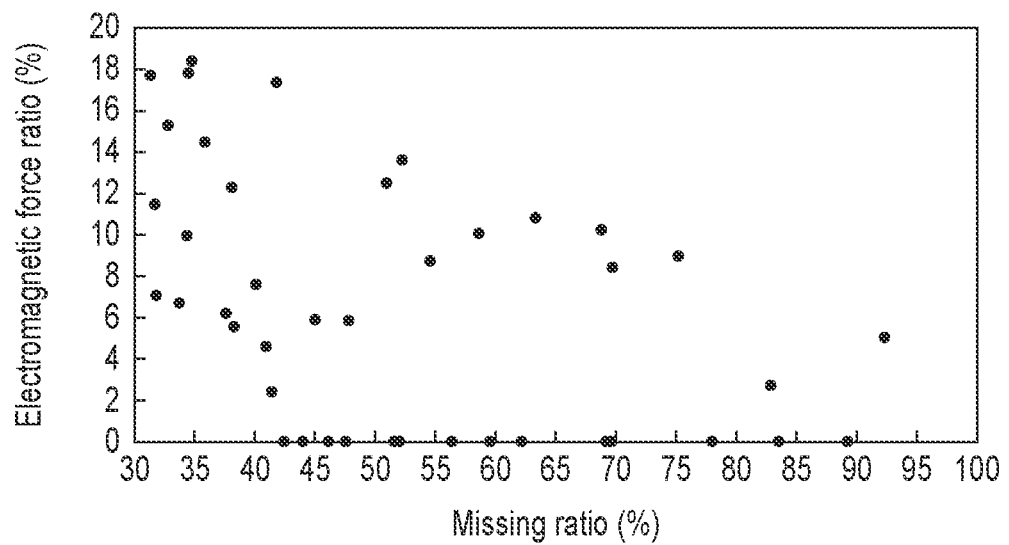
FIG. 5 illustrates a relationship between a length of a pair of chamfers in the circumferential direction, which is a missing portion of the teeth, and an electromagnetic force ratio.

FIG. 5 illustrates a relationship between the length of a pair of chamfers 40 which is a missing part of the teeth 21 in the circumferential direction (hereinafter referred to as circumferential direction ratio) and an electromagnetic force ratio. The circumferential direction ratio is a ratio of a total length of a pair of chamfers 40 in the circumferential direction ($L2 \times 2$) to the maximum width (W2) of the tip 23 of the teeth 21 with chamfers 40 in the circumferential direction to the maximum width (W2) ($L2 \times 2/W2$), and is shown as a deficient ratio in FIG. 5. The electromagnetic force ratio is an index with respect to the electromagnetic force of six types of order components including 6th, 12th, and 24th order electric angles in the radial direction in rotary electric machine 10 and 6th, 12th, and 24th order electric angles in the circumferential direction of the rotary electric machine 10, expressing the total ratio (%) of exceedance where the allowable range is set to 0. The electromagnetic force ratio here is an index in the rotary electric machine 10 with chamfers 40 and grooves 50 (first groove portion 51 and second groove portion 52), wherein the circumferential direction ratio of the chamfers 40 is changed. An electromagnetic force ratio of 0% indicates that the exceedance of electromagnetic force of the six order components remains within an acceptable range.

As in FIG. 5, when the circumferential direction ratio is less than 42% or greater than 89%, the electromagnetic force ratio tends not to be 0%. Therefore, the circumferential direction ratio of the chamfers 40 is preferred to be 42% or more and 89% or less (0.42≤L2×2/W2≤0.89). Therefore, in the present embodiment, the circumferential direction ratio of the chamfer 40 should be within the above range (0.42≤L2×2/W2≤0.89).

Figure 6:
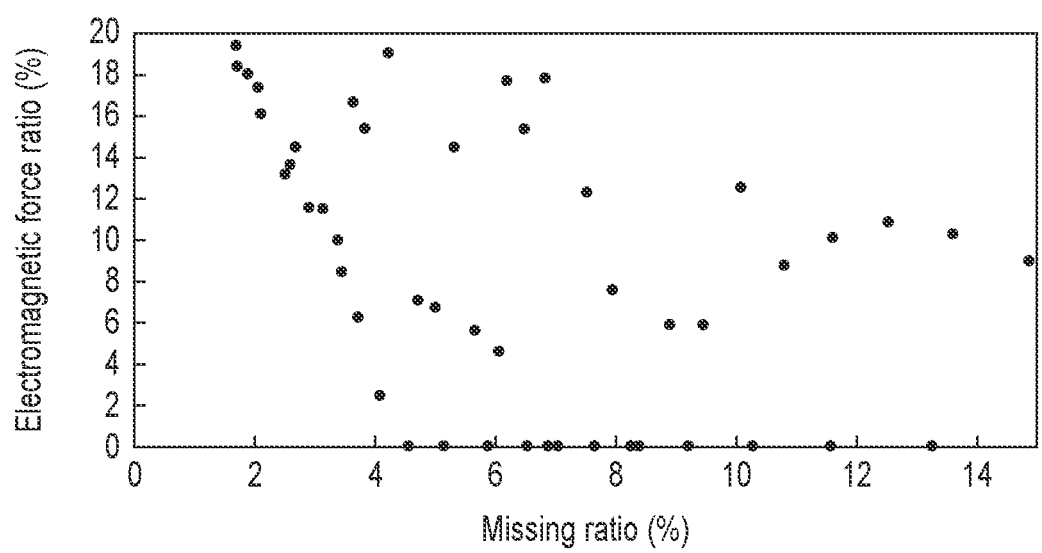
FIG. 6 illustrates a relationship between an area ratio of a pair of chamfers which is a missing portion of the teeth and the electromagnetic force ratio.

FIG. 6 illustrates a relationship between the area ratio of a pair of chamfers 40, which are missing parts of the teeth 21, and the electromagnetic force ratio. The area ratio is the ratio of the missing area (Ac×2) to the tip area (S) (Ac×2/S), and is shown as the missing ratio of FIG. 6. The electromagnetic force ratio is similar to the index shown in FIG. 5. However, the electromagnetic force ratio here is an index, in the rotary electric machine 10 with the chamfers 40 and grooves 50 (first groove portion 51 and the second groove portion 52), for a case where the area ratio of the chamfer 40 is changed.

As in FIG. 6, when the area ratio of a pair of chamfers 40 is less than 5% or more than 13%, the electromagnetic force ratio tends not to be 0%. Therefore, the ratio of the missing area (Ac×2) to the tip area (S) is preferred to be more than 5% and less than 13% (0.05≤Ac×2/S≤0.13). Therefore, in the present embodiment, the ratio of the missing area is in the above range (0.05≤Ac×2/S≤0.13).

Next, an arrangement of the first groove portion 51 and the second groove portion 52 of the groove 50 will be explained.

Figure 7:
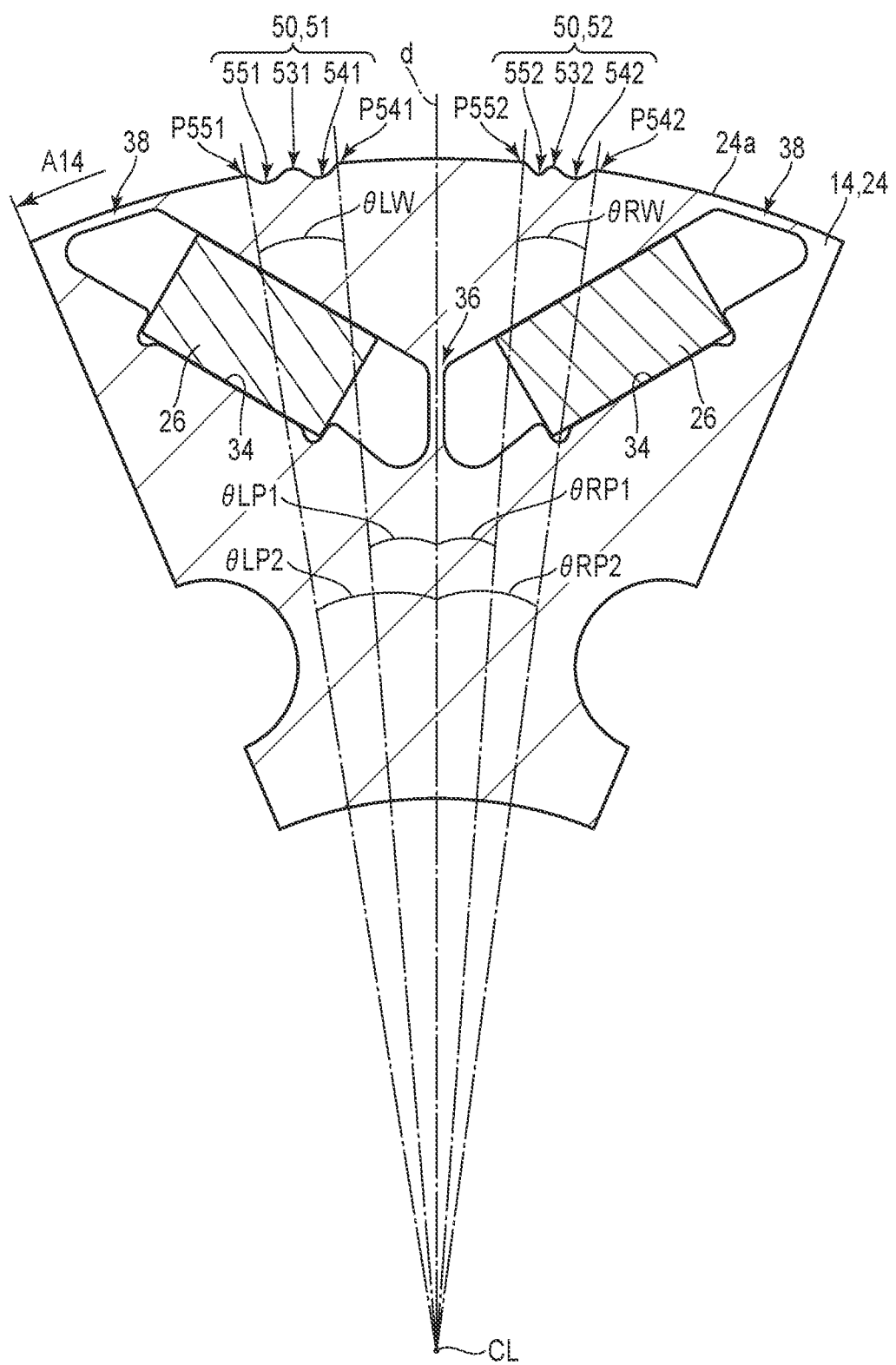
FIG. 7 illustrates an arrangement of a first groove portion and a second groove portion of FIGS. 1 and 2, in an enlarged manner.

FIG. 7 illustrates the first groove portion 51 and the second groove portion 52 of FIGS. 1 and 2, in an enlarged manner.

As in FIG. 7, the first groove portion 51 has an electrical angle with respect to the d-axis in a first range θLW. The first range θLW is a range of electrical angles calculated by a difference between an electrical angle θLP2 and an electrical angle θLP1. The electric angle θLP1 is the lower limit defining the first range θLW, and the electric angle θLP2 is the upper limit defining the first range θLW. The electrical angle θLP1 is an electrical angle indicating a position of the groove end in the trailing side in the rotation direction A14 of the first groove portion 51, and is an electrical angle of a continuous portion P541 between the concave portion 541 and the peripheral surface 24a of the rotor iron core 24 with respect to the d-axis. The electrical angle θLP2 is an electrical angle indicating a position of the groove end in the leading side of the rotation direction A14 of the first groove portion 51, and is an electrical angle of a continuous portion P551 between the concave portion 551 and the outer peripheral surface 24a of the rotor iron core 24 with respect to the d-axis.

Furthermore, as in FIG. 7, the second groove portion 52 has an electrical angle with respect to the d-axis in a second range θRW. The second range θRW is a range of electrical angles calculated by the difference between the electrical angle θRP2 and the electrical angle θRP1. The electrical angle θRP1 is the lower limit defining the second range θRW, and the electrical angle θRP2 is the upper limit defining the second range θRW. The electrical angle θRP1 is an electrical angle indicating a position of the groove end in the leading side of the rotation direction A14 of the second groove portion 52, and is an electrical angle of a continuous portion P552 between the concave portion 552 and the outer peripheral surface 24a of the rotor iron core 24 with respect to the d-axis. The electrical angle θRP2 is an electrical angle indicating a position of the groove end in the trailing side in the rotation direction A14 of the second groove portion 52, and is an electrical angle of a continuous portion P542 between the concave portion 542 and the peripheral surface 24a of the rotor iron core 24 with respect to the d-axis.

Figure 8:
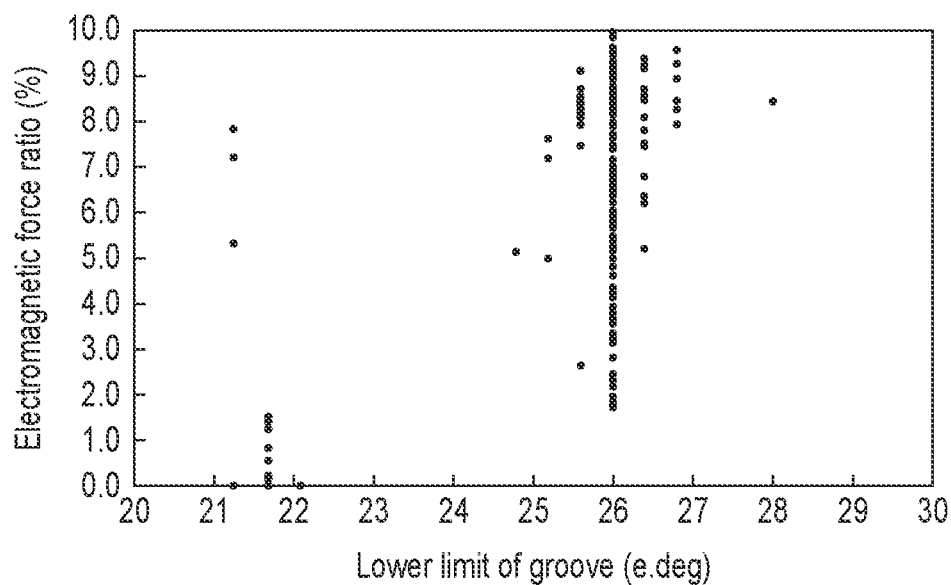
FIG. 8 illustrates a relationship between an electric angle ($\theta$LP1) of the first groove portion and the electromagnetic force ratio.

FIG. 8 illustrates a relationship between the electric angle θLP1 and the electromagnetic force ratio in the first groove portion 51. The electric angle θLP1 is shown as the lower limit of the groove (e.deg: electrical degree) in FIG. 8. The electromagnetic force ratio conforms to the index shown in FIG. 5. Note that, the electromagnetic force ratio here is an index in a case where the electric angle θLP1 of the first groove portion 51 is changed in the rotary electric machine 10 with the chamfers 40 and grooves 50 (first groove portion 51 and the second groove portion 52). As in FIG. 8, when the electrical angle θLP1 generally exceeds 22 degrees, the electromagnetic force ratio tends not to be 0%. The minimum value of the electric angle θLP1 at which the electromagnetic force ratio becomes 0% is 21.2 degrees. Note that, a case where the electromagnetic force ratio exceeds 10.0% is not plotted in FIG. 8.

Figure 9:
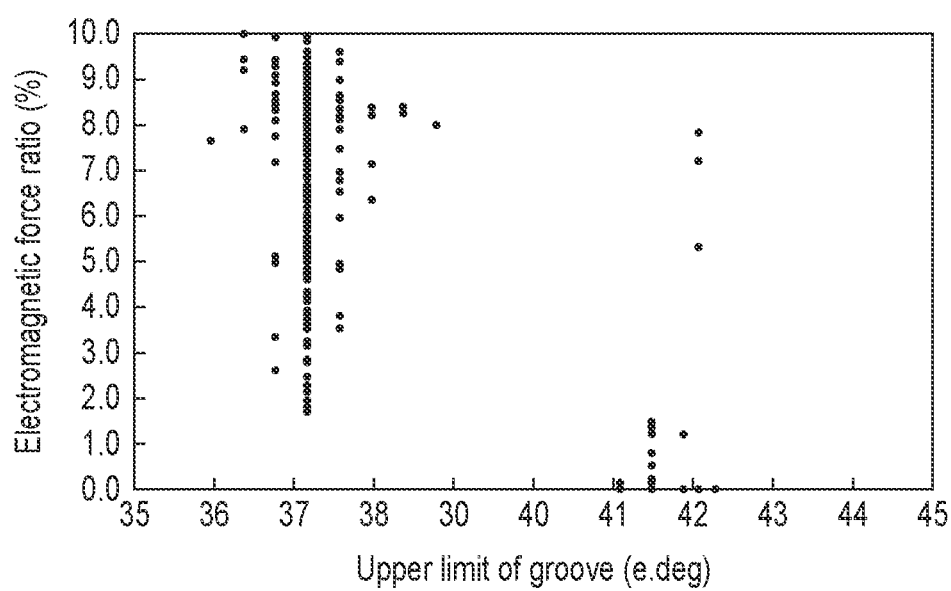
FIG. 9 illustrates a relationship between an electric angle ($\theta$LP2) of the first groove portion and the electromagnetic force ratio.

FIG. 9 illustrates a relationship between the electric angle θLP2 and the electromagnetic force ratio in the first groove portion 51. The electric angle θLP2 is shown as the upper limit of the groove (e.deg) in FIG. 9. The electromagnetic force ratio conforms to the index shown in FIG. 5. Note that, the electromagnetic force ratio here is an index in a case where the electric angle θLP2 of the first groove portion 51 is changed in the rotary electric machine 10 with the chamfers 40 and grooves 50 (first groove portion 51 and the second groove portion 52). As in FIG. 9, when the electrical angle θLP2 is generally below 41 degrees, the electromagnetic force ratio tends not to be 0%. The maximum value of the electric angle θLP2 at which the electromagnetic force ratio becomes 0% is 42.3 degrees. Note that, a case where the electromagnetic force ratio exceeds 10.0% is not plotted in FIG. 9.

Therefore, in the present embodiment, the first range θLW is should be set such that the electric angle θLP1 is 21.2 degrees or more and the electric angle θLP2 is 42.3 degrees or less. The first groove portion 51 should be located in the first range θLW.

Figure 10:
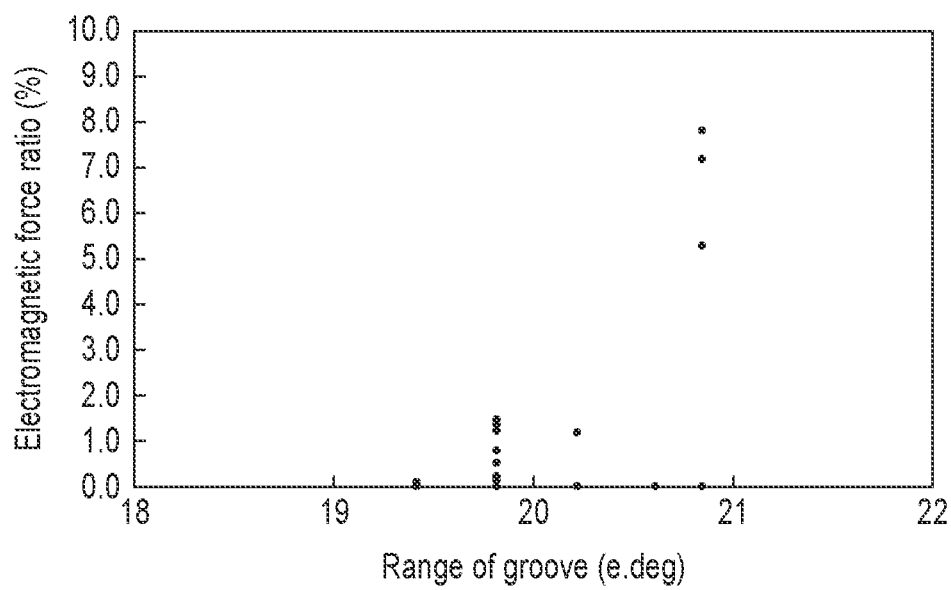
FIG. 10 illustrates a relationship between a first range ($\theta$LW) and the electromagnetic force ratio.

FIG. 10 illustrates a relationship between the first range θLW and the electromagnetic force ratio. The first range θLW is shown as a groove range (e.deg) in FIG. 10. Such groove range indicates the optimum range of the first range θLW calculated by a difference between the electric angles θLP1 and θLP2. The electromagnetic force ratio conforms to the index shown in FIG. 5. Note that, the electromagnetic force ratio here is an index in a case where the first range θLW is changed in the rotary electric machine 10 with the chamfers 40 and grooves 50 (first groove portion 51 and the second groove portion 52). As in FIG. 10, when the first range θLW is between 19.4 and 20.8 degrees, inclusive, the electromagnetic force ratio can be 0%. If the first range θLW is outside of the range, the electromagnetic force ratio exceeds 10.0% and is thus not plotted in FIG. 10.

Therefore, in the present embodiment, within the first range θLW, the first groove portion 51 is arranged over the entire range in which the electric angle θLP1 is 19.4 degrees or more and the electric angle θLP2 is 20.8 degrees or less.

Figure 11:
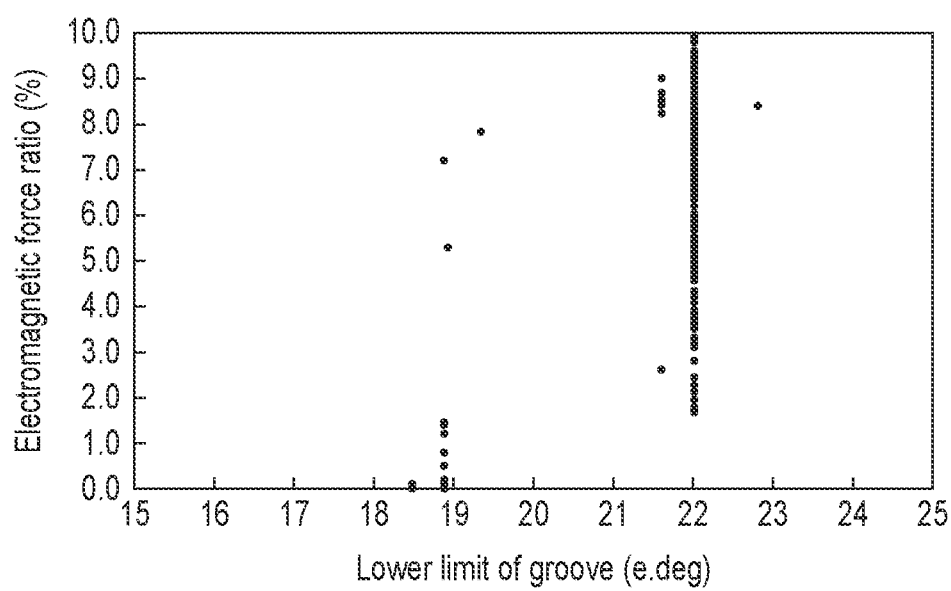
FIG. 11 illustrates a relationship between an electric angle ($\theta$RP1) of the second groove portion and the electromagnetic force ratio.

FIG. 11 illustrates a relationship between the electric angle θRP1 and the electromagnetic force ratio in the second groove portion 52. The electric angle θRP1 is shown as the lower limit of the groove (e.deg) in FIG. 11. The electromagnetic force ratio conforms to the index shown in FIG. 5. Note that, the electromagnetic force ratio here is an index in a case where the electric angle θRP1 of the second groove portion 52 is changed in the rotary electric machine 10 with the chamfers 40 and grooves 50 (first groove portion 51 and the second groove portion 52). As in FIG. 11, when the electrical angle θRP1 generally exceeds 19 degrees, the electromagnetic force ratio tends not to be 0%. The minimum value of the electric angle θRP1 at which the electromagnetic force ratio becomes 0% is 18.4 degrees. Note that, a case where the electromagnetic force ratio exceeds 10.0% is not plotted in FIG. 11.

FIG. 12 illustrates a relationship between the electric angle θRP2 and the electromagnetic force ratio in the second groove portion 52. The electric angle θRP2 is shown as the upper limit of the groove (e.deg) in FIG. 12. The electromagnetic force ratio conforms to the index shown in FIG. 5. Note that, the electromagnetic force ratio here is an index in a case where the electric angle θRP2 of the second groove portion 52 is changed in the rotary electric machine 10 with the chamfers 40 and grooves 50 (first groove portion 51 and the second groove portion 52). As in FIG. 12, when the electrical angle θRP2 is generally below 34 degrees, the electromagnetic force ratio tends not to be 0%. The maximum value of the electric angle θRP2 at which the electromagnetic force ratio becomes 0% is 34.4 degrees. Note that, a case where the electromagnetic force ratio exceeds 10.0% is not plotted in FIG. 12.

Therefore, in the present embodiment, the second range θRW is should be set such that the electric angle θRP1 is 18.4 degrees or more and the electric angle θRP2 is 34.4 degrees or less. The second groove portion 52 should be located in the second range θRW.

FIG. 13 illustrates a relationship between the second range θRW and the electromagnetic force ratio. The second range θRW is shown as a groove range (e.deg) in FIG. 13. Such groove range indicates the optimum range of the second range θRW calculated by a difference between the electric angles θRP2 and θRP1. The electromagnetic force ratio conforms to the index shown in FIG. 5. Note that, the electromagnetic force ratio here is an index in a case where the second range θRW is changed in the rotary electric machine 10 with the chamfers 40 and grooves 50 (first groove portion 51 and the second groove portion 52). As in FIG. 13, when the second range θRW is between 15.4 and 16.0 degrees, inclusive, the electromagnetic force ratio can be 0%. If the second range θRW exceeds 16.0 degrees, the electromagnetic force ratio exceeds 10.0% and is thus not plotted in FIG. 13.

Therefore, in the present embodiment, within the second range θRW, the second groove portion 52 is arranged over the entire range in which the electric angle θRP1 is 15.4 degrees or more and the electric angle θRP2 is 16.0 degrees or less.

Depth of the first groove portion 51 and depth of the second groove portion 52 in the groove 50 will be explained.

Figure 14:
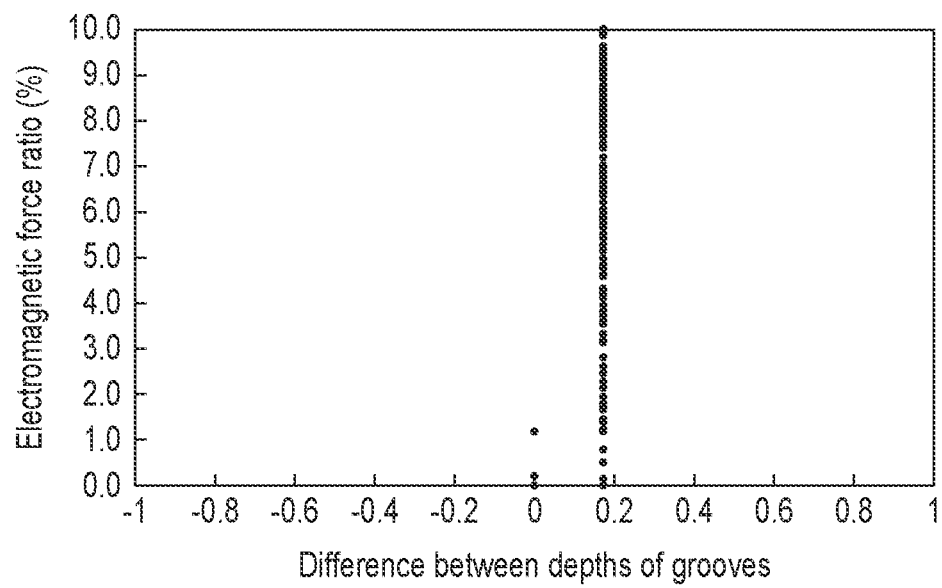
FIG. 14 illustrates a relationship between a difference between two concave portions in the first groove portion and the electromagnetic force ratio.

FIG. 14 illustrates a relationship between a difference in depths between the two concave portions 541 and concave portion 551 in the first groove portion 51 and the electromagnetic force ratio. Such a difference in depths is a ratio (%) of the difference between the maximum distance D541 of the concave portions 541 and the maximum distance D551 of the concave portions 551 (D541-D551) shown in FIG. 3 to the diameter of the circumscribed circle CO (distance Dia shown in FIG. 1), which is shown as the difference in groove depth in FIG. 14. The electromagnetic force ratio conforms to the index shown in FIG. 5. Note that, the electromagnetic force ratio here is an index in a case where the groove depth of the first groove portion 51 is changed in the rotary electric machine 10 with the chamfers 40 and grooves 50 (first groove portion 51 and second groove portion 52). As in FIG. 14, the difference in groove depth, i.e., ratio of the difference between the maximum distances D541 and D551 with respect to the diameter Dia of the circumscribed circle CO ((D541-D551/Dia)×100) is less than 0%, or more than 0.17%, the electromagnetic force ratio tends not to be 0%. In such cases, the electromagnetic force ratio exceeds 10.0% and thus is not plotted in FIG. 14. Therefore, the groove depth in the first groove portion 51 should be between 0% and 0.17%, inclusive (0≤(D541-D551/Dia)×100≤0.17).

Figure 15:
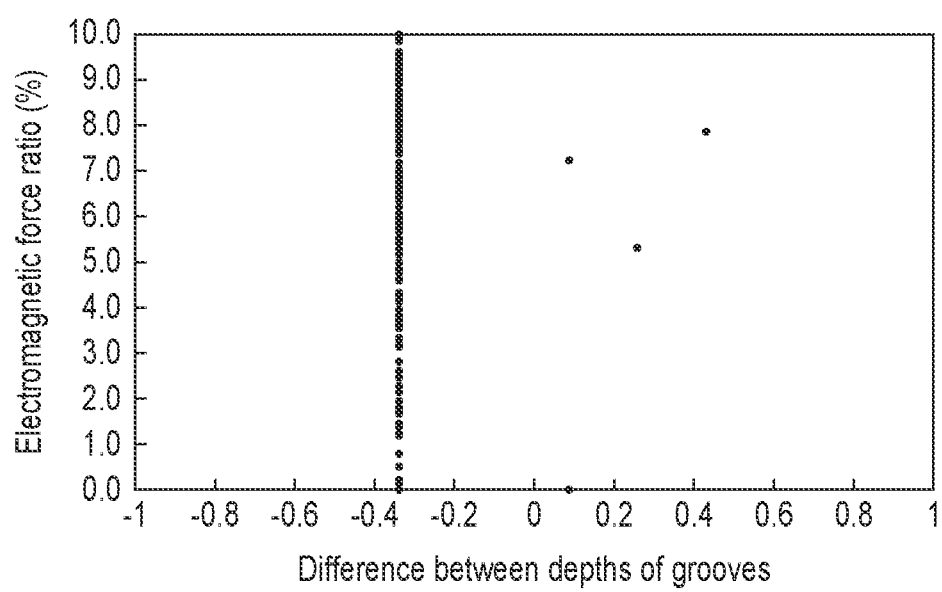
FIG. 15 illustrates a relationship between a difference between two concave portions in the second groove portion and the electromagnetic force ratio.

FIG. 15 illustrates a relationship between a difference in depths between the two concave portions 542 and concave portion 552 in the second groove portion 52 and the electromagnetic force ratio. Such a difference in depths is a ratio (%) of the difference between the maximum distance D542 of the concave portions 542 and the maximum distance D552 of the concave portions 552 (D542-D552) shown in FIG. 3 to the diameter of the circumscribed circle CO (distance Dia shown in FIG. 1), which is shown as the difference in groove depth in FIG. 15. The electromagnetic force ratio conforms to the index shown in FIG. 5. Note that, the electromagnetic force ratio here is an index in a case where the groove depth of the second groove portion 52 is changed in the rotary electric machine 10 with the chamfers 40 and grooves 50 (first groove portion 51 and second groove portion 52). As in FIG. 15, the difference in groove depth, i.e., ratio of the difference between the maximum distances D542 and D5521 with respect to the diameter Dia of the circumscribed circle CO ((D542-D552/Dia)×100) is less than −0.4%, or more than 0.1%, the electromagnetic force ratio tends not to be 0%. If the difference in groove depth is less than −0.4%, the electromagnetic force ratio exceeds 10.0% and thus is not plotted in FIG. 15. Therefore, the groove depth in the second groove portion 52 should be between −0.4% and 0.1%, inclusive (−0.4≤(D542-D552/Dia)×100≤0.1).

Thus, according to the present embodiment, the harmonics related to integer multiples of the 6th order of the electric angle (24th order of the machine angle) generated in the rotary electric machine 10, especially the electromagnetic force of six types of order components of the 6th, 12th, and 24th order of the electric angle in the radial direction, and the 6th, 12th, and 24th order of the electric angle in the circumferential direction can be reduced. The effect of the reduction of electromagnetic force of harmonics by the present embodiment will be explained by comparison with comparative examples.

The rotary electric machine 10 of the present embodiment (hereinafter referred to as the present case) includes both chamfers 40 and grooves 50 (first groove portion 51 and second groove portion 52) as in FIGS. 1 and 2. As comparative examples to the present case, FIGS. 16A, 16B, 16C, and 16D show comparative examples with different models of grooves 501, 502, and 503 of a rotor iron core 24 than the model of the groove 50. Note that, components that are the same or similar to those in the present case will be referred to with the same symbols as in the present case in the drawings.

Figure 16A:
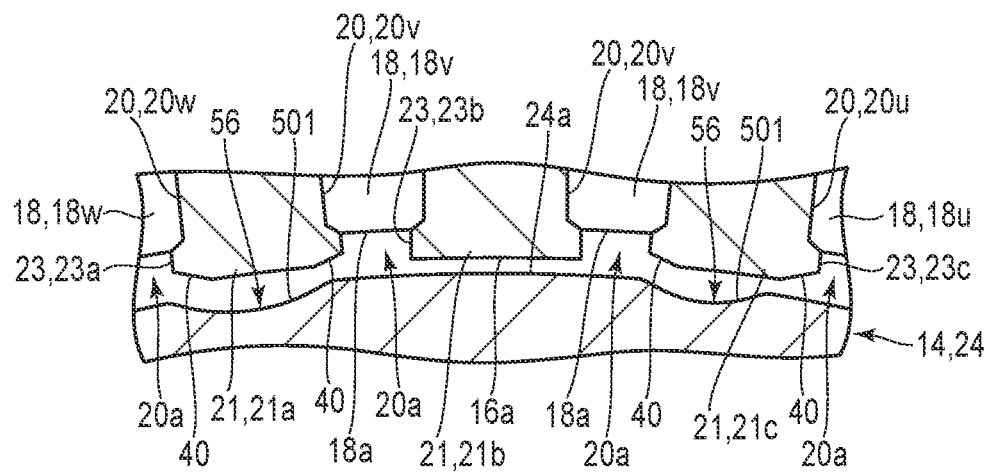
FIG. 16A illustrates a comparative example (A) in which a model of grooves of the rotor iron core is different from the present embodiment.

FIG. 16A illustrates a groove 501 formed with a single concave portion without a convex portion 53 in each pole of the rotor iron core 24. The groove 501 is curved in a concave arc shape throughout, and a groove bottom 56 is also curved rather than flat.

Figure 16B:
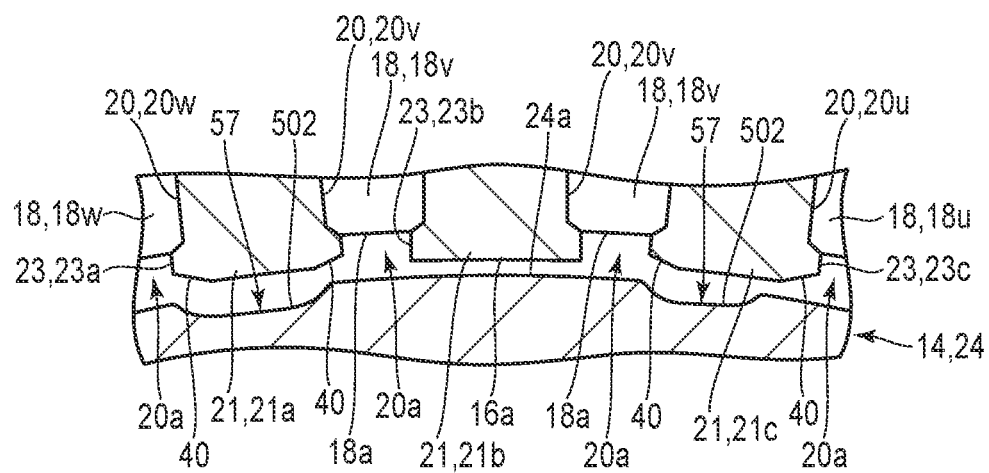
FIG. 16B illustrates a comparative example (B) in which a model of grooves of the rotor iron core is different from the present embodiment.

FIG. 16B illustrates a groove 502 formed with a single concave portion without a convex portion 53 in each pole of the rotor iron core 24. The groove 502 differs from the groove 501 in that the groove bottom 57 is flat, and the portions other than the groove bottom 57 are curved into a concave arc shape.

Figure 16C:
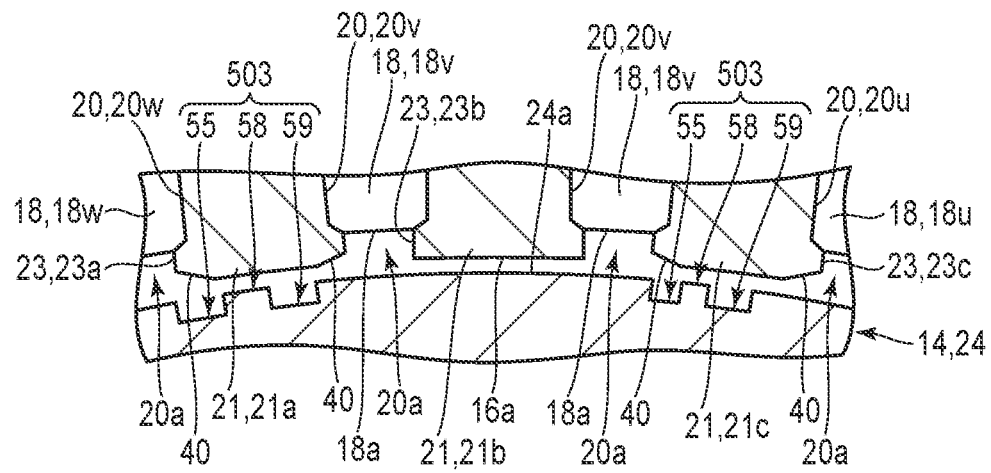
FIG. 16C illustrates a comparative example (C) in which a model of grooves of the rotor iron core is different from the present embodiment.

FIG. 16C illustrates a groove 503 with two concave portions 59, one at both sides in the circumferential direction with a convex portion 58 interposed therebetween in each pole of the rotor iron core 24. The convex portions 58 and 59 are rectangular in shape.

Figure 16D:
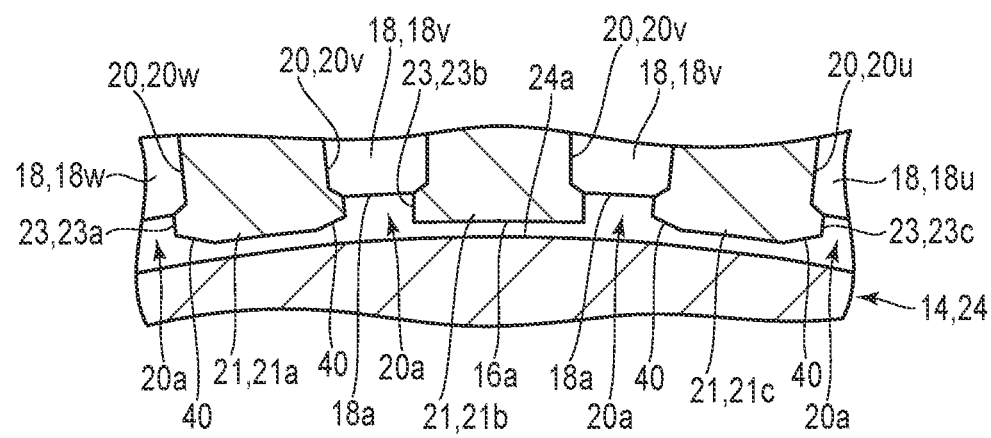
FIG. 16D illustrates a comparative example (E) in which a model of grooves of the rotor iron core is different from the present embodiment.

FIG. 16D, the rotor iron core 24 does not have a portion corresponding to groove 50. In other words, the outer peripheral surface 24a of the rotor iron core 24 is a continuous surface without irregularities.

Comparative examples with respect to the teeth 21 of the stator iron core 16 will be considered in which the arrangements of chamfers are different from the present case. These comparative examples are three; an example in which all the teeth 21 are provided with chamfers of the same model as the chamfer 40, an example in which teeth 21 defining the edges of the openings 20a of the slots 20 through which armature windings 18 of same phase pass are provided with chamfers of the same model as the chamfer 40, and an example in which none of the teeth 21 include a portion corresponding to the chamfer 40.

Figure 17:
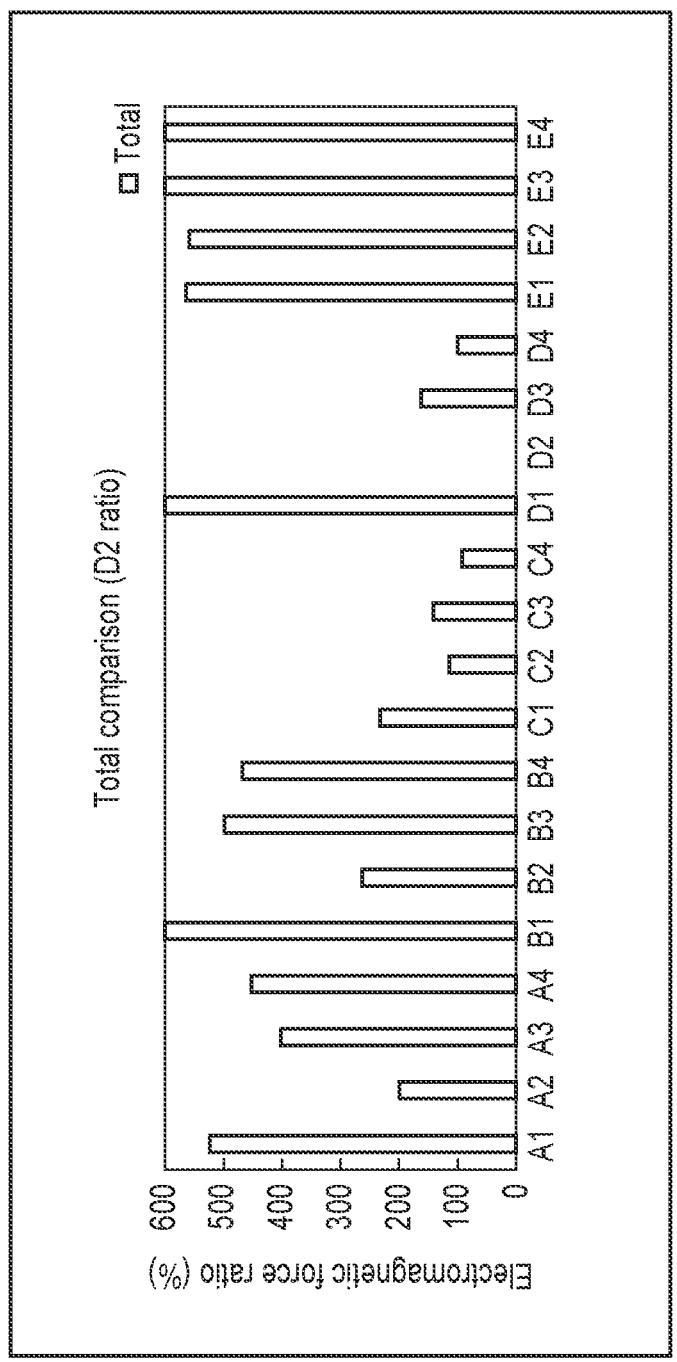
FIG. 17 illustrates electromagnetic force ratio of each comparative example where the present embodiment is set to 0.

Here, the five groove patterns of the rotor iron core 24 shown in FIGS. 16A to 16D and the groove pattern of the rotor iron core 24 shown in FIG. 2, the chamfer model of the aforementioned stator iron core 16, and four chamfer models of the stator iron core 16 of FIG. 2 are combined, and such twenty combinations will be studied with respect to the electromagnetic force ratios. FIG. 17 illustrates the electromagnetic force ratio in each comparative example as a ratio when the present case is 0.0% indicates that the electromagnetic force ratio is equal to or less than that of the present case. Therefore, if the electromagnetic force ratio is greater than the present case, the electromagnetic force ratio of the comparison example is positive, and if it is equal to or less than the present case, the electromagnetic force ratio of the comparison example is 0.

In FIG. 17, A to E on the horizontal axis indicate the groove pattern of the rotor iron core 24, A is the groove pattern of groove 501 shown in FIG. 16A, B is the groove pattern of groove 502 shown in FIGS. 16B, and C is the groove pattern of groove 503 shown in FIGS. 16C, and D is the groove pattern of the groove 50 shown in FIGS. 2, and E is the groove pattern (no groove) shown in FIG. 16D. The numbers 1 to 4 on the horizontal axis indicate the chamfer models of the stator iron core 16, and 1 indicates a model in which chamfers 40 are provided with all teeth 21, 2 indicates a model in which chamfers 40 are provided with teeth 21 between slots 20 of different phases, 3 indicates a model in which chamfers are provided with teeth 21 between the slots of same phase, and 4 indicates a model in which no chamfer is provided. In FIG. 17, the combinations of the grooves and chamfers models of the present case and in the comparative examples are shown by these combinations of A to E and 1 to 4. For example, FIG. 16A illustrates the combination of A1, FIG. 16A illustrates the combination of A2, FIG. 16B illustrates the combination of B2, FIG. 16C illustrates the combination of C2, FIG. 16D illustrates the combination of E2, and the combination of D2 is the present case.

As in FIG. 17, all of the comparative examples other than the present case indicated as D2 have an electromagnetic force ratio exceeding 0%. In other words, the comparative examples other than the present case indicated as D2 the total ratio (%) of the exceedance when the allowable range is set to 0 with respect to the electromagnetic force of six different order components of 6th, 12th, and 24th order in the radial direction and 6th, 12th, and 24th order in the circumferential direction is higher than in the present case. Therefore, with the groove and chamfer model of D2 of the present case, the harmonics with respect to integer multiples of the 6th order electrical angle (24th order mechanical angle) in the rotary electric machine 10, especially the electromagnetic force of six different order components of the 6th, 12th, and 24th order electrical angles in the radial direction, as well as the 6th, 12th, and 24th order electrical angles in the circumferential direction can be reduced. In other words, the rotary electric machine 10 can suppress the harmonics of the electromagnetic force at the targeted operating point, thereby reducing vibration and noise.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotary electric machine comprising:
a stator including a cylindrical stator iron core in which teeth and slots are arranged alternately in a circumferential direction, and multi-phase armature windings passing through the slots to be wound about the teeth; and
a rotor including a rotor iron core with a plurality of magnetic poles aligned along an outer peripheral surface which is opposed to an inner peripheral surface of the stator iron core with a gap therebetween, and a plurality of permanent magnets provided with each of the magnetic poles, the rotor disposed rotatably about a central axis line which is coaxial with the stator iron core, wherein
in the stator iron core, tips of the teeth defining openings of the slots in the inner peripheral surface between the slots through which the armature windings of different phases pass include a pair of chamfers which are both ends of the inner peripheral surface partially omitted in the circumferential direction, wherein,
given that, in the horizontal cross-section of the rotor iron core which is orthogonal to the central axis line, an axis extending radially passing an end of the magnetic pole in the circumferential direction and the central axis line is q-axis and an axis electrically apart from the q-axis in the circumferential direction at 90 degrees is d-axis,
in each of the magnetic poles, the rotor iron core includes a plurality of grooves the outer peripheral surface of which is concave along the central axis line, each of the grooves forms a wave shape in which concave portions are placed on both sides of a convex portion along a rotation direction of the rotor, and includes a first groove portion disposed in a leading side of the rotation direction with respect to the d-axis between the q-axis passing the both ends of the magnetic pole in the circumferential direction and a second groove portion disposed in a trailing side of the rotation direction, and the first groove portion and the second groove portion are asymmetric with respect to the d-axis.

2. The rotary electric machine of claim 1, wherein in the first groove portion, a maximum gap between one of the two concave portions which is closer to the d-axis and a circumscribed circle contacting the outer peripheral surface of the rotor iron core is greater than a maximum gap between the other concave portion and the circumscribed circle, and the convex portion is arranged inside the circumscribed circle, and in the second groove portion, a maximum gap between one of the two concave portions which is closer to the d-axis and the circumscribed circle is greater than a maximum gap between the other concave portion and the circumscribed circle, and the convex portion is arranged inside the circumscribed circle.

3. The rotary electric machine of claim 1, wherein the first groove portion has an electric angle with respect to the d-axis which is set in a first range between 21.2 and 42.3 degrees inclusive, and the second groove portion has an electric angle with respect to the d-axis between 18.4 and 34.4 degrees inclusive.

4. The rotary electric machine of claim 3, wherein the first groove portion is arranged within the first range such that the electric angle with respect to the d-axis is in the entire range between 19.4 and 20.8 degrees inclusive, and the second groove portion is arranged within the second range such that the electric angle with respect to the d-axis is in the entire range between 15.4 and 16.0 degrees inclusive.

5. The rotary electric machine of claim 3, wherein a ratio of a difference between the maximum gaps between each of the two concave portions of the first groove portion and the circumscribed circle contacting the outer peripheral surface of the rotor iron core to the diameter of the circumscribed circle is between 0 and 0.17% inclusive, and a ratio of a difference between the maximum gaps between each of the two concave portions of the second groove portion and the circumscribed circle to the diameter is between −0.4 and 0.1% inclusive.

6. The rotary electric machine of claim 1, wherein a ratio of a total length of the pair of the chamfers in the circumferential direction to a maximum width of the tip portion of the teeth in the circumferential direction is between 42 and 89% inclusive, a ratio of a total area of the pair of the chamfers viewed from a direction of the central axis line to an area of the tip portion of the teeth which does not have a chamfer is between 5 and 13% inclusive, and a maximum width of the circumferential direction of the tip portion of the teeth is greater than a maximum width of the circumferential direction of the teeth other than the tip portion thereof.

7. The rotary electric machine of claim 2, wherein a ratio of a total length of the pair of the chamfers in the circumferential direction to a maximum width of the tip portion of the teeth in the circumferential direction is between 42 and 89% inclusive, a ratio of a total area of the pair of the chamfers viewed from a direction of the central axis line to an area of the tip portion of the teeth which does not have a chamfer is between 5 and 13% inclusive, and a maximum width of the circumferential direction of the tip portion of the teeth is greater than a maximum width of the circumferential direction of the teeth other than the tip portion thereof.

8. The rotary electric machine of claim 3, wherein a ratio of a total length of the pair of the chamfers in the circumferential direction to a maximum width of the tip portion of the teeth in the circumferential direction is between 42 and 89% inclusive, a ratio of a total area of the pair of the chamfers viewed from a direction of the central axis line to an area of the tip portion of the teeth which does not have a chamfer is between 5 and 13% inclusive, and a maximum width of the circumferential direction of the tip portion of the teeth is greater than a maximum width of the circumferential direction of the teeth other than the tip portion thereof.

9. The rotary electric machine of claim 4, wherein a ratio of a total length of the pair of the chamfers in the circumferential direction to a maximum width of the tip portion of the teeth in the circumferential direction is between 42 and 89% inclusive, a ratio of a total area of the pair of the chamfers viewed from a direction of the central axis line to an area of the tip portion of the teeth which does not have a chamfer is between 5 and 13% inclusive, and a maximum width of the circumferential direction of the tip portion of the teeth is greater than a maximum width of the circumferential direction of the teeth other than the tip portion thereof.

10. The rotary electric machine of claim 5, wherein a ratio of a total length of the pair of the chamfers in the circumferential direction to a maximum width of the tip portion of the teeth in the circumferential direction is between 42 and 89% inclusive, a ratio of a total area of the pair of the chamfers viewed from a direction of the central axis line to an area of the tip portion of the teeth which does not have a chamfer is between 5 and 13% inclusive, and a maximum width of the circumferential direction of the tip portion of the teeth is greater than a maximum width of the circumferential direction of the teeth other than the tip portion thereof.

* * * * *